(12) United States Patent
Yarabolu

(10) Patent No.: US 11,615,281 B2
(45) Date of Patent: Mar. 28, 2023

(54) PAYMENT CARD WITH LIGHT-BASED SIGNATURE

(71) Applicant: Bank of America Corporation, Charlotte, NC (US)

(72) Inventor: Vijay Kumar Yarabolu, Telenga (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/560,361

(22) Filed: Dec. 23, 2021

(65) Prior Publication Data

US 2022/0121892 A1 Apr. 21, 2022

Related U.S. Application Data

(63) Continuation of application No. 16/937,148, filed on Jul. 23, 2020, now Pat. No. 11,250,304.

(51) Int. Cl.
| | |
|---|---|
| G06K 19/06 | (2006.01) |
| B42D 25/36 | (2014.01) |
| B42D 25/305 | (2014.01) |
| B42D 25/351 | (2014.01) |

(52) U.S. Cl.
CPC ....... *G06K 19/0614* (2013.01); *B42D 25/305* (2014.10); *B42D 25/351* (2014.10); *B42D 25/36* (2014.10); *G06K 19/06037* (2013.01); *G06K 19/06187* (2013.01)

(58) Field of Classification Search
CPC ......... G06K 19/0614; G06K 19/06037; G06K 19/06187; B42D 25/305; B42D 25/351; B42D 25/36

USPC ......................................................... 235/494
See application file for complete search history.

(56) References Cited

U.S. PATENT DOCUMENTS

| | | |
|---|---|---|
| 6,193,156 B1 | 2/2001 | Han et al. |
| 7,104,449 B2 | 9/2006 | Han et al. |
| 7,178,277 B2 | 2/2007 | Takeuchi |
| 7,577,257 B2 | 8/2009 | Xia et al. |
| 7,590,868 B2 | 9/2009 | Musa et al. |
| 7,645,510 B2 | 1/2010 | Argoitia |
| 7,929,700 B2 | 4/2011 | Lodewyck et al. |
| 8,340,298 B2 | 12/2012 | Gelfond et al. |
| 8,483,394 B2 | 7/2013 | Nordholt et al. |
| 8,582,769 B2 | 11/2013 | Zhao et al. |
| 8,639,932 B2 | 1/2014 | Wiseman et al. |
| 8,650,401 B2 | 2/2014 | Wiseman et al. |
| 8,693,691 B2 | 4/2014 | Jacobs |
| 8,744,075 B2 | 6/2014 | Tanaka |
| 8,897,449 B1 | 11/2014 | Broadbent |
| 8,903,094 B2 | 12/2014 | Bovino |
| 10,607,216 B1 | 3/2020 | Ilincic et al. |
| 2001/0010333 A1 | 8/2001 | Han et al. |
| 2013/0300101 A1 | 11/2013 | Wicker et al. |

(Continued)

*Primary Examiner* — Daniel A Hess
(74) *Attorney, Agent, or Firm* — Weiss & Arons LLP

(57) ABSTRACT

Systems, methods and apparatus are provided for light-based authentication of a payment card. The payment card may include a randomized mix of materials. The materials may include transparent or translucent materials. A light source may shine light on a surface of the payment card. Light passing through the card may generate a light pattern that is unique to the payment card. The light pattern may be captured and compared to a reference light pattern to authenticate the payment card. In some embodiments, photodetectors may detect light patterns generated through interactions with the card materials.

20 Claims, 3 Drawing Sheets

(56) References Cited

U.S. PATENT DOCUMENTS

| | | |
|---|---|---|
| 2015/0213666 A1 | 7/2015 | Schiffmann et al. |
| 2018/0201045 A1 | 7/2018 | Quintana Arregui et al. |
| 2018/0309785 A1 | 10/2018 | Kurian |
| 2020/0086675 A1 | 3/2020 | Ide et al. |

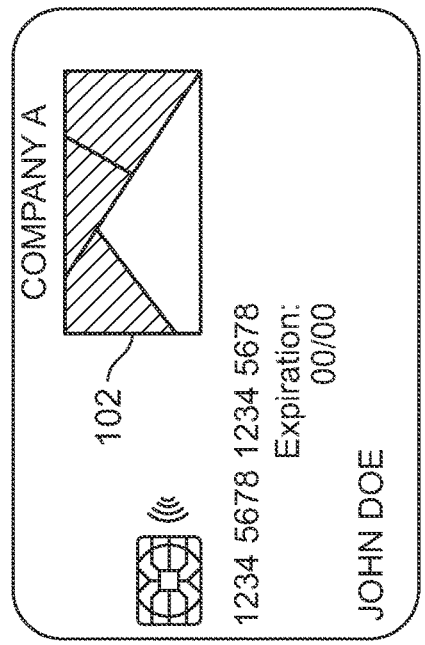
FIG. 1A
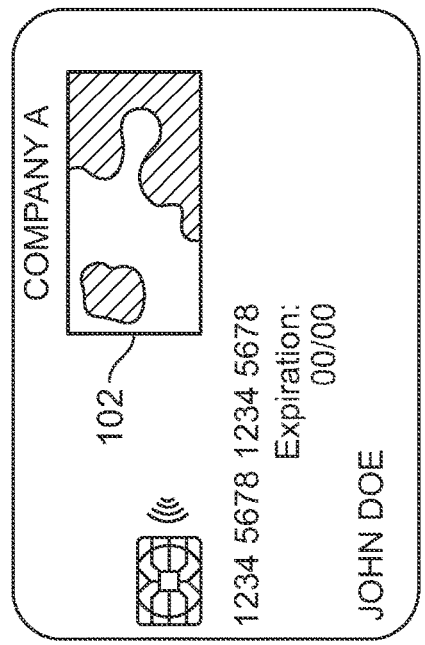
FIG. 1B
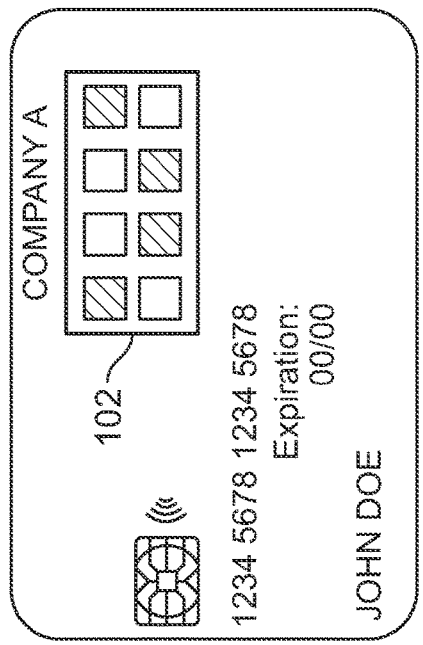
FIG. 1C
FIG. 1D

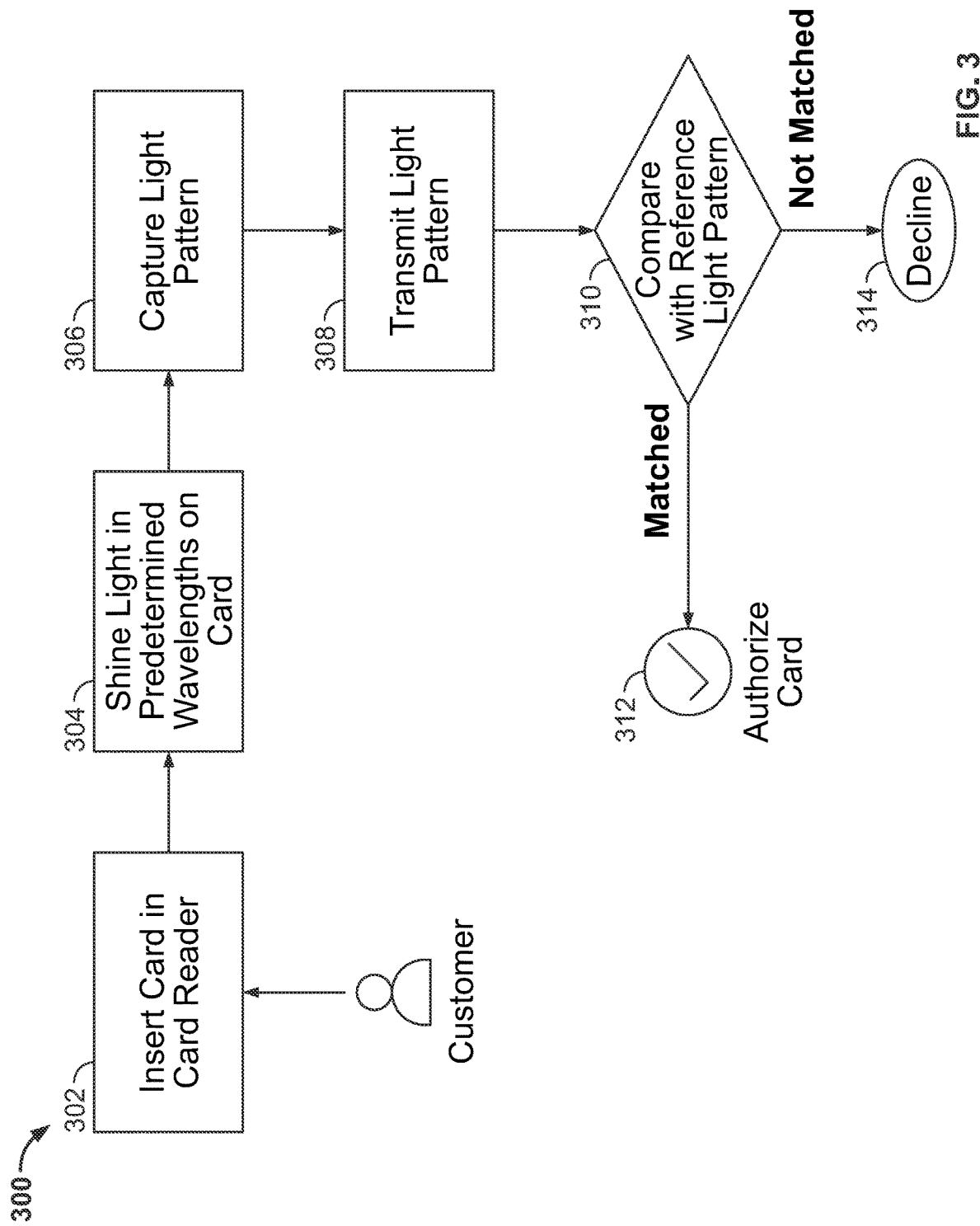

PAYMENT CARD WITH LIGHT-BASED SIGNATURE

CROSS REFERENCE TO RELATED APPLICATION

This application is a continuation of U.S. patent application Ser. No. 16/937,148 filed on Jul. 23, 2020 and entitled "PAYMENT CARD WITH LIGHT-BASED SIGNATURE" which is hereby incorporated by reference herein in its entirety.

FIELD OF TECHNOLOGY

Aspects of the disclosure relate to light-based protocols for authenticating a payment card.

BACKGROUND OF THE DISCLOSURE

Payment cards such as credit or debit cards typically encode sensitive user information in a magnetic strip or an EMV chip. Even if a card remains in a user's possession, this sensitive information may be extracted by a bad actor during a point of sale transaction or other use of the card. In addition, card data may be compromised while stored in an issuer database or a merchant database. A bad actor may use the data to generate a cloned credit card with the user account information.

It would be desirable to provide a unique physical card signature, i.e. a pattern of light passing through the card, reflecting off the card, or generated by interaction with the card, that cannot be easily replicated on a cloned payment card.

SUMMARY OF THE DISCLOSURE

Systems, methods and apparatus for light-based authentication of a payment card are provided.

The payment card may include a randomized mix of materials. The materials may include translucent or transparent materials.

A light source may generate light in a predetermined range of wavelengths. The light source may be positioned to shine light on a front surface of the payment card.

An image capture device may capture a light pattern cast by light from the light source passing through the card. The image capture device may convert the captured light pattern to a digital image.

A processor in communication with the image capture device may compare the digital image of the captured light pattern to a digital image of a reference light pattern. The processor may authenticate the payment card when the digital image of the captured light pattern matches the digital image of the reference light pattern.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 1A shows illustrative apparatus in accordance with principles of the disclosure;

FIG. 1B shows illustrative apparatus in accordance with principles of the disclosure;

FIG. 1C shows illustrative apparatus in accordance with principles of the disclosure;

FIG. 1D shows illustrative apparatus in accordance with principles of the disclosure;

FIG. 3 shows an illustrative process flow in accordance with principles of the disclosure.

DETAILED DESCRIPTION

Figure 2:
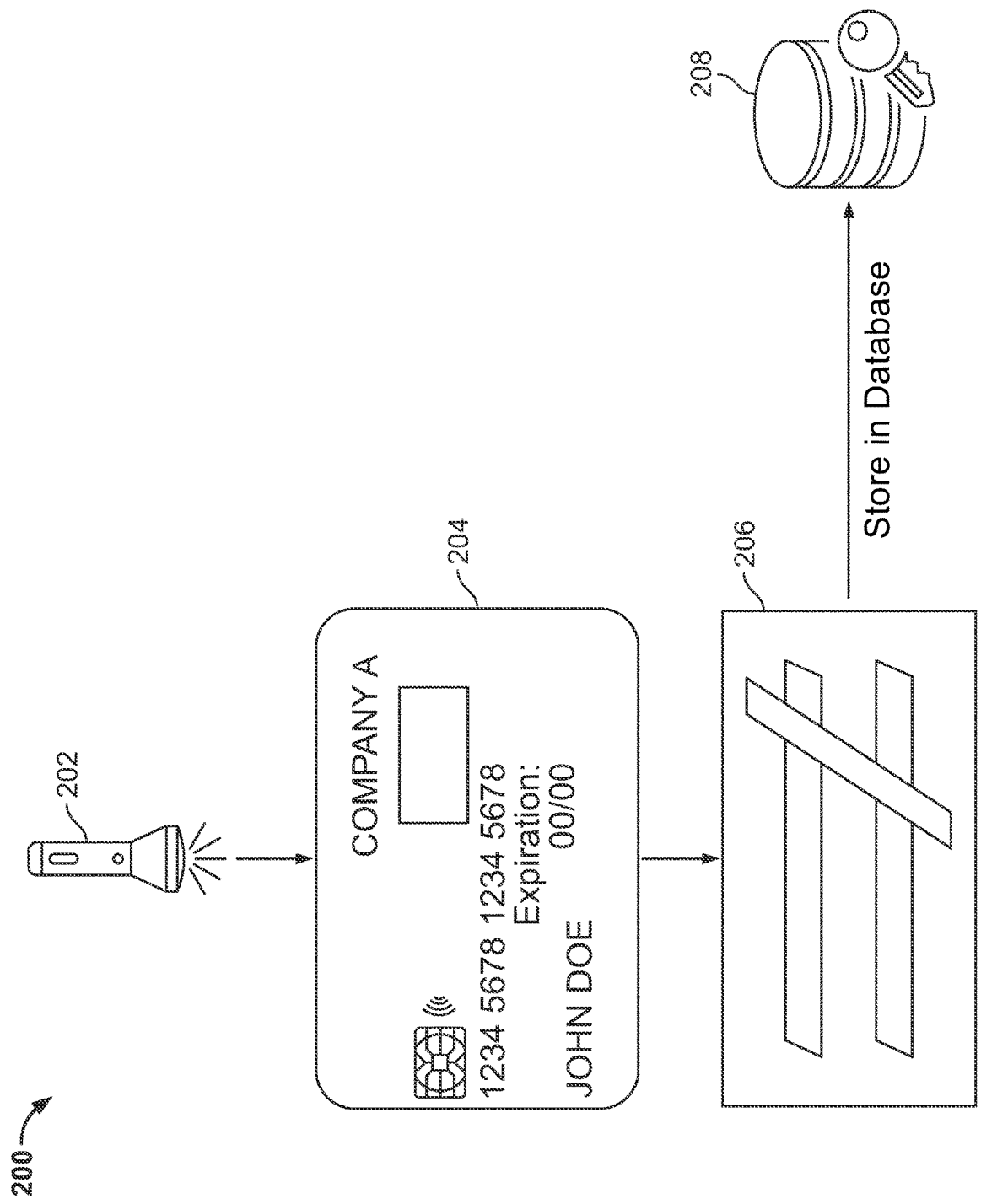
FIG. 2 shows illustrative system components in accordance with principles of the disclosure.

Systems, methods and apparatus may include a payment card with a unique light-based signature. The payment card signature may be a distinguishing physical feature that marks the card as unique.

The payment card may have a size and thickness similar or identical to a conventional credit card. The payment card may have a thickness that is not greater than 0.8 millimeters ("mm") and a surface area that is not greater than 86 mm×54 mm. Such a compact form factor may allow the payment card to be inserted into traditional card readers and function as a typical debit or credit card. The payment card may include a magnetic strip for encoding user identification or user account information. The payment card may include an EMV chip.

The payment card may be composed of a randomized mix of materials. In some embodiments, the payment card materials may be randomly selected from a predetermined set of materials. In some embodiments, the set of payment card materials may be fixed, but the arrangement of materials within the card may be randomized. In some embodiments, both the selection and the arrangement of payment card materials may be randomized. The materials may be synthetic materials, organic materials or a combination of synthetic and organic materials.

In some embodiments, the entire payment card may be composed of the randomized mix of materials. In some embodiments a predefined panel within the payment card may be composed of the randomized mix of materials. The panel may be any suitable size.

Some or all of the randomized mix of materials may allow light to pass through the card. In some embodiments, the materials may include transparent or translucent materials. The transparent or translucent materials may be colorless or may be tinted with one or more colors.

In some embodiments the payment card may include holes, slits or other perforations that enable light to pass through the card. The card may include any suitable number of perforations. The distribution of perforations may be random or may form a specific pattern. The perforations may be continuous or discrete. The perforations may be randomly located across the entire card surface. The perforations may be confined to a predefined panel on the card. In some embodiments, a predefined panel that includes the perforations may be covered with a protective coating to prevent the perforations from becoming blocked. In some embodiments, the perforations may be protected by a laminated covering encasing the entire card.

In some embodiments, the entire payment card may be formed from a transparent or translucent material. A predefined panel on a transparent payment card may include a randomized combination of transparent and opaque materials. The randomized placement of opaque materials may produce a unique pattern when light passes through the payment card. In some embodiments, placement of a logo or other standard card elements on a transparent or translucent payment card may be randomly varied to change the pattern of light and shadow cast by light passing through the card.

Systems, methods and apparatus may include a light source. The light source may emit light in a single wavelength or a range of wavelengths. The light may be in the visible spectrum. The light may be outside the visible spectrum, such as UV light. The light source may include incandescent bulbs, light emitting diodes (LEDs), or any suitable light emitting medium. The light source may include one or more fixed or adjustable filters. The light source may include a laser or a set of lasers.

Systems, methods and apparatus may include an image capture device for capturing a pattern generated by light passing through the payment card. In some embodiments, the light source and the image capture device may be combined in a single unit.

The unit may include slots or grooves to maintain a payment card at a consistent distance from the light source and the image capture device. In some embodiments, markers or other guidelines may indicate the correct card position with respect to the light source. The payment card may be positioned so that light shines on a front surface of the card. The payment card may be positioned so that light shines on a rear surface of the card.

The unit may be a card reader. In some embodiments, the card reader may also perform transaction functions. The card reader may be located at a point of sale. The card reader may be part of an ATM.

The image capture device may include a camera or a scanner for capturing an image of the light pattern. The light pattern may be cast on a surface below the card and may be captured from above. The light pattern may fall directly on a surface of the image capture device such as a scanner platen or a digital camera lens.

The image capture device may capture a colored image for a light pattern that includes one or more colors. The image capture device may digitize a captured image for comparison or storage.

The light source and the image capture device may be powered by any suitable power source. In some embodiments, a unit including the light source and the image capture device may be portable and powered by a battery. The battery may be rechargeable.

A reference light pattern may be determined prior to issuance of the payment card. The reference light pattern may be based on light passing through the card at each of the predetermined wavelengths or ranges of wavelengths emitted by the light source. The reference light patterns may be stored in association with data identifying the payment card, the user and/or a user account. The reference light patterns may be stored in a remote database.

At a time of use, the light source may shine light on the surface of the payment card at one of the predetermined wavelengths or ranges of wavelengths. A light pattern cast by light passing through the payment card may be captured and compared to a stored reference light pattern. Data identifying the user or the payment card may be used to access the stored reference light pattern.

Any suitable image recognition algorithm may be used to compare the light pattern at time of use to the reference light pattern. Illustrative image comparison methods include template matching and point feature matching. Systems, apparatus and methods may apply deep learning neural networks such as a convolutional neural network (CNN). A CNN is particularly suited for processing 2D images because it convolves learned features with input data and uses 2D convolutional layers for classification.

When a light pattern produced at the time of use matches the reference light pattern, the payment card may be authenticated. The match may be a percentage match. The payment card may be authenticated when the percentage match is at or above a predetermined threshold. The payment card may be declined when the percentage match is below the threshold. In some embodiments, multiple percentages may be recorded, each associated with a different aspect of the image match. Different thresholds may be applied for each of these percentage matches. In some embodiments, the authentication may function as a secondary form of authentication.

In some embodiments, data associated with the reference light pattern may be encoded on the payment card magnetic strip. In some embodiments, an image of the reference light pattern may be encoded on the payment card magnetic strip. A light pattern at a time of use may be compared to the reference light pattern obtained from the magnetic strip to authenticate the card. In this way, the payment card may be self-authenticating. Even if the magnetic strip were to be compromised, a payment card with a light-based signature would still be protected from cloning, as reconstruction of the exact mix and placement of card materials would be prohibitively time-consuming and expensive.

In some embodiments, the payment card may include a diffraction grating. Each payment card may include a unique diffraction grating. In some embodiments, each payment card may be randomly assigned one of a fixed set of diffraction gratings. The diffraction grating may separate light emitted by the light source into individual wavelengths. One or more photodetectors or photosensors may detect light in the specific wavelengths and generate electrical signals in response. In some embodiments a 2D array of photosensors may generate a digital image. Photosensors may be incorporated along with the light source into a single unit.

Optimal placement of photosensors may be determined prior to issuance of the payment card. The diffraction grating may be placed in a predetermined position with respect to a light source. Optimal placement of photosensors may be determined based on the angle of incidence and the wavelengths involved.

At the time of use, the payment card including the diffraction grating may be placed in the predetermined position with respect to a light source. Photosensors may be located in the predetermined optimal positions for detection of the refracted light. If the photosensors detect refracted light in the correct wavelengths, the payment card may be authenticated.

In some embodiments, the payment card may incorporate materials that fluoresce in response to light at a predetermined wavelength. The light may be UV light. In some embodiments, the randomized mix of materials may include materials that fluoresce when exposed to UV light.

A pattern of fluorescence for the randomized mix of card materials may be determined prior to issuance of the payment card. The payment card may be placed in a predetermined position beneath a light source. An image detection device may capture a reference fluorescence pattern on the surface of the payment card. At the time of use, a fluorescence pattern may be captured by an image detection device and compared to a stored reference pattern.

In some embodiments, fluorescence may be detected by photosensors positioned to detect wavelengths produced in response to light from the light source. Optimal placement of the photosensors may be determined prior to issuance of the payment card. The payment card may be placed in a predetermined position beneath a light source. Optimal placement of photosensors may be determined based on the angle of incidence and the wavelengths to be detected.

At the time of use, the payment card including the fluorescent material may be placed in the same position with respect to a light source. Photosensors may be located in the optimal position to detect the fluorescence. If the photosensors detect fluorescence in the correct wavelengths, the payment card may be authenticated.

In some embodiments, the payment card may be a metal card. The metal card may include grooves, indentations, or other formations that affect a light beam directed at the card. Photosensors may be positioned in predetermined optimal locations to detect light reflecting off the payment card. In some embodiments, the photosensors may include photodiodes or phototransistors capable of translating the light into electrical signals to produce images or sound for card authentication.

The payment card may be combined with a protective case or holder to prevent damage to features associated with the light-based signature. Payment cards incorporating these features may be replaced on a more frequent basis than conventional cards.

In some embodiments, the randomized mix of materials may include a combination of opaque materials. The light emission source may irradiate the payment card with photons at one of the predetermined wavelengths.

The photons may pass through the payment card using quantum tunneling. Quantum tunneling effect is a property of quantum physics that enables a particle to pass through a physical barrier. Due to the randomized mix of materials, each payment card will have a different mix of refractive indices as well as different absorption and scatter properties. As a result, each payment card will have a different effect on the velocity of the photons passing through the card.

The pattern of velocities for the photons passing through the various card materials may provide a unique quantum-based light signature for the payment card.

The system may store a reference velocity spectrum for each of the predetermined wavelengths emitted by the light source. The reference spectra may be stored in association with other data identifying the payment card, the user or a user account.

At a time of use, the payment card may be irradiated with light at one of the predetermined wavelengths. The velocity spectrum for the photons passing through the payment card may be detected. The velocity spectrum may be compared to a stored reference velocity spectrum for the predetermined wavelength. If the velocity spectrum at the time of use matches the reference spectrum, the payment card may be authenticated.

For the sake of illustration, the invention will be described as being performed by a "system." The system may include one or more features of the apparatus and methods that are described herein and/or any other suitable device or approach.

The system may include various hardware components. Such components may include a battery, a speaker, and antenna(s). The system may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. Software may include an operating system, application programs, web browser and a database. Alternatively, some or all of computer executable instructions of the system may be embodied in hardware or firmware components of the system.

Application programs, which may be used by the system, may include computer-executable instructions for invoking user functionality related to communication, authentication services, and voice input and speech recognition applications. Application programs may utilize one or more algorithms that encrypt information, process received executable instructions, interact with enterprise systems, perform power management routines or other suitable tasks.

The system may operate in a networked environment. The system may support establishing communication channels with one or more enterprise systems. The system may connect to a local area network ("LAN"), a wide area network ("WAN") a cellular network or any suitable communication network. When used in a LAN networking environment, the system may be connected to the LAN through a network interface or adapter. When used in a WAN networking environment, the system may include a modem or other means for establishing communications over a WAN, such as the Internet. It will be appreciated that the existence of any of various well-known protocols such as TCP/IP, Ethernet, FTP, HTTP and the like is presumed.

The system may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The system may utilize computer-executable instructions, such as program modules, being executed by a computer. Generally, program modules include routines, programs, objects, components, data structures, etc. that perform particular tasks or implement particular abstract data types. The system may be operational with distributed computing environments where tasks are performed by remote processing devices that are linked through a communications network. In a distributed computing environment, program modules may be located in both local and remote computer storage media including memory storage devices.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIGS. 1A-1D shows illustrative payment card 100. In FIG. 1A, payment card 100 includes light-based signature panel 102. Panel 102 includes a randomized mix of opaque and translucent materials.

In FIGS. 1B and 1C, a randomized selection of opaque and transparent materials is placed into predefined spaces within panel 102. The opaque materials may be identical to the material used for the rest of the card. The transparent materials may be tinted with a variety of colors.

In FIG. 1D, panel 102 includes a randomized set of openings. Panel 102 may include a protective coating to prevent occlusion of the openings. In some embodiments, the pattern of openings may be randomly selected from a predefined set of patterns.

FIG. 2 shows illustrative system components 200 for authenticating a payment card with a light-based signature. The system components may include one more features of payment card 100, shown in FIGS. 1A-1D.

Payment card 204 is generated using a randomized mix of materials. The randomized materials include transparent and translucent materials. Payment card 204 is positioned below light source 202. Light from light source 202, shining through the translucent areas of payment card 204, produces light pattern 206. Light pattern 206 may be captured and compared to a reference light pattern stored in database 208. If light pattern 206 matches the reference light pattern, the payment card may be authenticated. In some embodiments light source 202 may be combined with an image capture device in a single unit.

FIG. 3 shows illustrative process flow 300 for authenticating a payment card having unique a light-based signature. Process flow 300 may include one or more features of payment card 100, shown in FIGS. 1A-1D. Process flow 300 may include one or more of system components 200, shown in FIG. 2.

At step 302, a user inserts the payment card in a card reader. At step 304, the card reader shines light with a particular wavelength or range of wavelengths on the surface of the card. At step 306, the card reader captures a light pattern produced by light passing through the randomized mix of payment card materials. At step 308 the captured light pattern is transmitted to a server. At step 310, the captured light pattern is compared to a reference light pattern stored in database memory. If the light pattern matches the reference light pattern, at step 312 the card is authenticated and a payment is authorized. If the light pattern does not match the reference light pattern, at step 314 the payment is declined.

Thus, methods and apparatus for a PAYMENT CARD WITH LIGHT-BASED SIGNATURE are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for light-based authentication of a payment card, the system comprising:
   a payment card comprising a randomized mix of materials;
   a light source configured to emit light in a predetermined range of wavelengths;
   an image capture device configured to:
      capture a light pattern, the light pattern appearing when light from the light source passes through the payment card; and
      convert the captured light pattern to a digital image; and
   a processor in communication with the image capture device, the processor configured to:
      compare the digital image of the captured light pattern to a digital image of a reference light pattern; and
      authenticate the payment card when the digital image of the captured light pattern matches the digital image of the reference light pattern, the match comprising a percentage match that is greater than a predetermined threshold;
   wherein:
      the payment card comprises a material that fluoresces in response to light emitted by the light source;
      the image capture device comprises a photosensor configured to detect a fluoresced wavelength, the photosensor position determined based on an angle of incidence and a predetermined wavelength; and
      the captured light pattern comprises a fluoresced wavelength and the reference light pattern comprises the predetermined wavelength.

2. The system of claim 1 wherein the randomized mix of materials comprises a translucent material.

3. The system of claim 1, wherein the randomized mix of materials comprises a single material having a randomized pattern of perforations.

4. The system of claim 1, wherein the randomized mix of materials is located within a defined portion of the payment card, the defined portion smaller than the entire card.

5. The system of claim 1, wherein the light source is positioned above a front surface the payment card and the image capture device is positioned below a rear surface of the payment card.

6. The system of claim 1, wherein the light source and the image capture device are combined in a single unit.

7. The system of claim 1, wherein an encoded magnetic strip on the payment card is configured to store the digital image of the reference light pattern.

8. A method for light-based authentication of a payment card, the method comprising:
   generating a payment card comprising a randomized mix of materials;
   emitting light from a light source in a predetermined range of wavelengths, light source positioned to irradiate a surface of the payment card;
   capturing a light pattern with an image capture device, the light pattern cast by light from the light source passing through the payment card;
   converting the captured light pattern to a digital image;
   accessing a digital image of a reference light pattern, the digital image of the reference light pattern associated with a payment card account;
   comparing the digital image of the captured light pattern to a digital image of a reference light pattern to determine a percentage match;

authenticating the payment card when the percentage match is at or above a predetermined threshold; and declining the payment card when the percentage match is below a predetermined threshold;

wherein:

the payment card comprises a material that fluoresces in response to light emitted by the light source;

the image capture device comprises a photosensor configured to detect a fluoresced wavelength, the photosensor position determined based on an angle of incidence and a predetermined wavelength; and the captured light pattern comprises a fluoresced wavelength and the reference light pattern comprises the predetermined wavelength.

9. The method of claim 8, wherein the randomized mix of materials comprises a transparent material.

10. The method of claim 8, wherein the randomized mix of materials comprises a single material having a randomized pattern of perforations.

11. The method of claim 8, wherein the randomized mix of materials is located within a defined portion of the payment card, the defined portion smaller than the entire card.

12. The method of claim 8, wherein the light source is positioned above the payment card and the image capture device is positioned below the payment card.

13. The method of claim 8, wherein the light source and the image capture device are combined in a single card reader unit.

14. The method of claim 8, wherein a digital image of the reference light pattern is stored on an encoded magnetic strip on the payment card.

15. A card reader for light-based authentication of a payment card, the card reader comprising:

a light source configured to emit light in a predetermined range of wavelengths, the light source positioned to irradiate a surface of a payment card;

an image capture device configured to:

capture a light pattern, the light pattern generated when light from the light source passes through the payment card; and convert the captured light pattern to a digital image; and a processor configured to:

access a reference light pattern associated with a payment card account;

compare the captured light pattern to the reference light pattern; and authenticate the payment card when the digital image of the captured light pattern matches the digital image of the reference light pattern, the match comprising a percentage match that is greater than a predetermined threshold;

wherein:

the payment card comprises at least one material that fluoresces in response to light from the light source;

the image capture device comprises a photosensor configured to detect a fluoresced wavelength, the photosensor position determined based on an angle of incidence and a predetermined wavelength; and the captured light pattern comprises the fluoresced wavelength and the reference light pattern comprises the predetermined wavelength.

16. The card reader of claim 15, wherein the payment card comprises a randomized mix of opaque and transparent materials.

17. The card reader of claim 16, wherein the randomized mix of materials is located within a defined portion of the payment card, the defined portion smaller than the entire card.

18. The card reader of claim 15, wherein the payment card comprises a randomized pattern of perforations.

19. The card reader of claim 15, wherein the light source is positioned above the payment card and the image capture device is positioned below the payment card.

20. The card reader of claim 15, wherein the reference light pattern is encoded on a payment card magnetic strip.

* * * * *